(12) United States Patent
Richards et al.

(10) Patent No.: US 9,910,515 B2
(45) Date of Patent: Mar. 6, 2018

(54) USER INTERFACE FOR A TOUCHSCREEN OF A PORTABLE COMMUNICATION DEVICE

(71) Applicant: MOTOROLA SOLUTIONS, INC, Schaumburg, IL (US)

(72) Inventors: Scott H. Richards, Plantation, FL (US); Goktug Duman, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/139,969

(22) Filed: Apr. 27, 2016

(65) Prior Publication Data

US 2017/0315630 A1  Nov. 2, 2017

(51) Int. Cl.
*G06F 3/0362* (2013.01)
*G06F 3/0488* (2013.01)
(Continued)

(52) U.S. Cl.
CPC ............ *G06F 3/0362* (2013.01); *G06F 1/163* (2013.01); *G06F 3/0416* (2013.01);
(Continued)

(58) Field of Classification Search
CPC ...... G06F 3/0362; G06F 1/163; G06F 3/0416; G06F 3/04847; G06F 3/0481;
(Continued)

(56) References Cited

U.S. PATENT DOCUMENTS

2006/0256090 A1* 11/2006 Huppi ..................... A63F 13/02
345/173
2007/0222765 A1  9/2007 Nyyssonen
2008/0119237 A1* 5/2008 Kim ....................... G06F 3/0481
455/566
2008/0238879 A1* 10/2008 Jaeger ................. G06F 3/03545
345/173
2010/0328203 A1  12/2010 Hsu
2011/0050587 A1* 3/2011 Natanzon ............ G06F 3/04842
345/173
2012/0256862 A1  10/2012 Wagner
2014/0168132 A1* 6/2014 Graig ...................... G06F 3/044
345/174
2014/0247246 A1  9/2014 Maus
(Continued)

FOREIGN PATENT DOCUMENTS

EP        1621989 A2    2/2006

OTHER PUBLICATIONS

Kane, Shaun K. et al.: "Touchplates: Low-cost Tactile Overlays for Visually impaired Touch Screen Users", Proceedings of the 15th International ACM SIGACCESS Conference on Computers and Accessibility Article No. 22, Publication Date: Oct. 21, 2013, ACM New York, NY, 2013, all pages.
(Continued)

*Primary Examiner* — Richard Hong
(74) *Attorney, Agent, or Firm* — Barbara R. Doutre

(57) ABSTRACT

A user interface (102) for a touchscreen (106) is provided. The user interface (102) comprises a physical overlay (108) having a rotatable guide wheel (110) with access through-holes (112, 114) formed therein. The touchscreen (106) of a portable communication device (104) can be accessed though the access through-holes (112, 114) and controlled via the rotatable guide wheel (110) without having to view the screen. Fingertip insertion into the access through-holes (112, 114) activates and selects different predetermined functions, while rotation of the rotatable guide wheel (110) controls variation for each predetermined function. The user interface may (102) be incorporated as part of a carry case, holster (130), harness or formed as an attachable and removable overlay plate (308) to correspond with the touchscreen (106).

20 Claims, 7 Drawing Sheets

(51) Int. Cl.
  *G06F 3/0484*  (2013.01)
  *G06F 3/041*  (2006.01)
  *G06F 3/16*  (2006.01)
  *G06F 1/16*  (2006.01)

(52) U.S. Cl.
  CPC ...... *G06F 3/04847* (2013.01); *G06F 3/04883* (2013.01); *G06F 3/162* (2013.01); *G06F 3/165* (2013.01); *G06F 2203/04104* (2013.01); *G06F 2203/04808* (2013.01)

(58) Field of Classification Search
  CPC .. G06F 3/04842; G06F 3/017; G06F 3/04883; G06F 3/165; G06F 3/162; G06F 2203/04808; G06F 2203/04104; A63F 13/02
  See application file for complete search history.

(56) References Cited

U.S. PATENT DOCUMENTS

| | | | |
|---|---|---|---|
| 2015/0220178 A1 | 8/2015 | Zeliff et al. | |
| 2016/0162092 A1* | 6/2016 | Kukimoto | G06F 3/167 345/173 |
| 2016/0259461 A1* | 9/2016 | Abbate | G06F 3/017 |

OTHER PUBLICATIONS

The PCT Search Report and the Written Opinion, corresponding serial No. PCT/US2017/027175 filed Apr. 12, 2017, all pages.

\* cited by examiner

USER INTERFACE FOR A TOUCHSCREEN OF A PORTABLE COMMUNICATION DEVICE

FIELD OF THE INVENTION

The present invention relates generally to user interfaces and more particularly to a user interface for use with a touchscreen of a portable communication device.

BACKGROUND

A touch panel or touchscreen is an input device used in smartphones, tablet computers and other communication devices. A touchscreen allows a user to interface with an electronic device by having the user view the screen and touch pictures, icons or words displayed on the screen which in turn enables certain functionalities associated with the device. In order to view and access the touchscreen, the user is typically positioned to face the touchscreen. This positioning to view the touchscreen can be problematic in situations where the user is operating the device in an environment where he or she wishes to change or control a function without having the ability to readily view and access the touchscreen of the device.

Environments were access to a touchscreen of an electronic device may be problematic, include but are not limited to, public safety environments, such as law enforcement, fire and rescue environments. The integration of touchscreens into certain devices, such as portable public safety radios and accessories, presents a challenge to designers in that the ability to view and access a touchscreen on such devices is sometimes impractical. For example, public safety radios and accessories, such as those carried by public safety personnel, are often worn on a belt, harness, or epaulette making the ability to view and easily access a touchscreen impractical for the user.

Accordingly, it would be beneficial to have an improved user interface which would permit access to a touchscreen of a portable communication device. The ability to access a touchscreen without having to view the touchscreen would be highly beneficial, particularly for public safety communication devices where visibility and access to a touchscreen may be limited.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
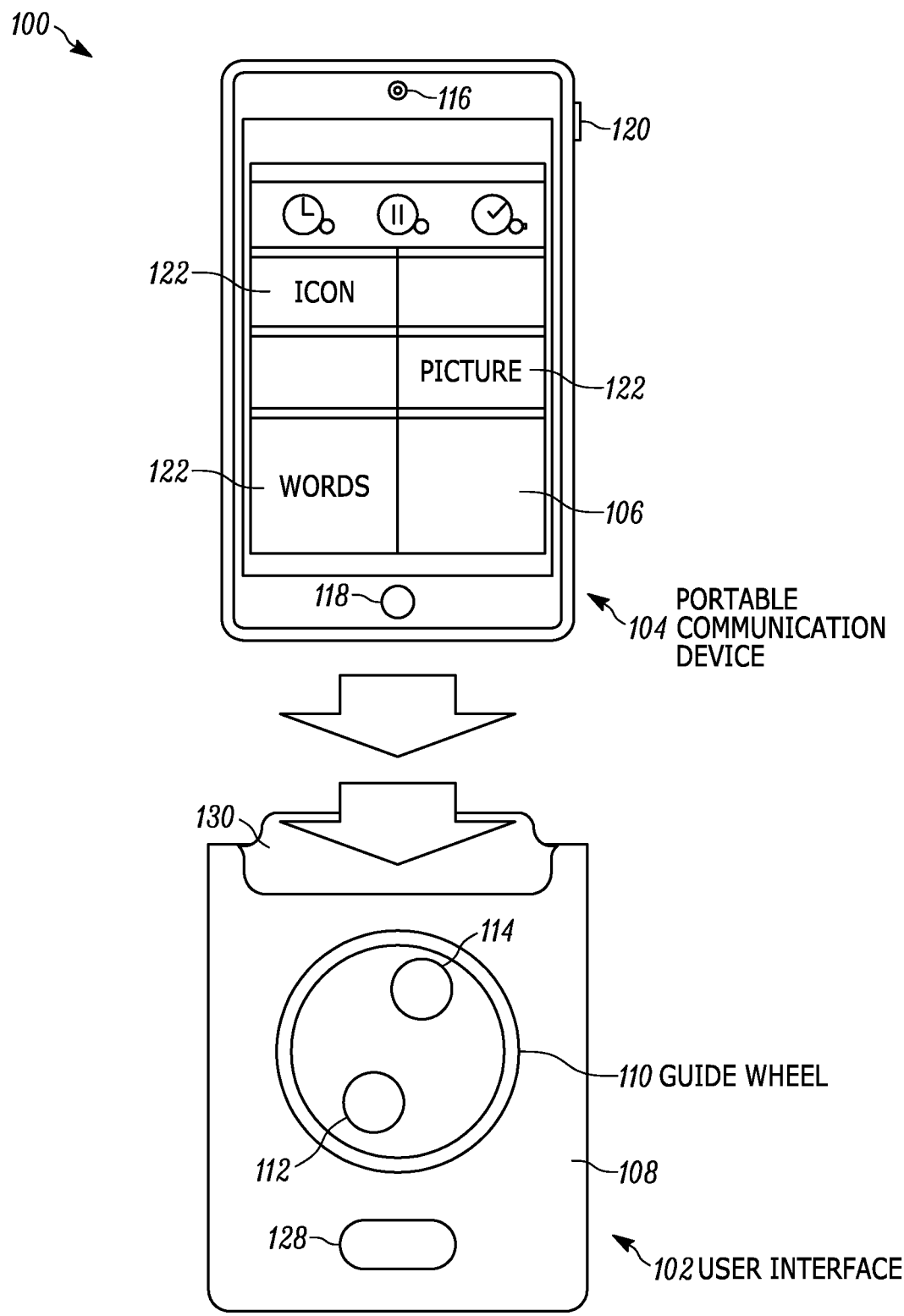
FIG. 1 is a user interface for a portable communication device having a touchscreen in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a user interface for a touchscreen of a portable communication device. The user interface comprises a physical overlay having a rotatable guide wheel with access through-holes formed therein. The touchscreen of the portable communication device can be accessed via the through-holes and controlled via the rotatable guide wheel without having to view the screen. Fingertip insertion into the access through-holes selects different predetermined functions, while rotation of the rotatable guide wheel controls variability for each selected predetermined function. The user interface may be incorporated as part of a carry case, holster or harness or formed as an attachable and removable plate to align with the touchscreen. The user interface is particularly advantageous for wearable devices having limited viewing of a touch screen.

Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a communication system 100 comprising a user interface 102 for a portable communication device 104 having a touchscreen 106 in accordance with some embodiments. Portable communication device 104 may be any portable communication device having an electronic touchscreen responsive to a user's fingertip inputs, the touchscreen under control of an internal controller (shown in FIG. 4). The portable communication device 104 may be a body wearable, portable public safety radio or accessory comprising the controller, a transceiver, a microphone 116, and a speaker 118, along with a push-to-talk (PTT) button 120. The touchscreen 106 may display icons, pictures and/or words 122 for use during viewing positions where visibility to the screen is not limited.

Such public safety devices, as well as some non-public safety portable communication devices, may be carried in a holster or carry case, or on a belt, harness, or epaulette making the ability to view and access the touchscreen 106 impractical for the user. The various embodiments described herein are aimed at simplifying a user's ability to interact with the touchscreen 106 of the portable communication device 104 in environments where viewing the touchscreen is impractical, or not possible, such as when worn on a user's body.

In accordance with the various embodiments, the user interface 102 comprises a physical overlay 108 having a rotatable guide wheel 110 with access through-holes 112, 114 formed therein, also referred to as fingertip access through-holes. Rotatable guide wheel 110 will also be referred to as guide wheel 110. In accordance with the various embodiments, the user interface 102 may be incorporated within a carry case, holster, or formed as snap on/off plate to provide alignment of the user interface with the touchscreen 106. In FIG. 1, the user interface 102 is embodied into a carry case or holster 130. The user interface 102 is thus removably coupled to the portable communication device 104.

In accordance with the various embodiments, a combination of the fingertip access through-holes 112, 114 along with rotation of the rotatable guide wheel 110 provide activation and control of predetermined functions of the portable communication device 104. As will be shown in subsequent views the fingertip access through-holes 112, 114 are used to activate a predetermined function of the communication device, while rotation of the guide wheel provides control of that selected function.

In some embodiments coupling of the user interface 102 to the portable communication device 104 may automatically enable a user interface mode recognized by the communication device controller. In communication system 100, the portable communication device 104 being inserted into the user interface 102 embodied as a holster or carry case 130 to be worn on a user's body may automatically enable the user interface mode. Alternatively, a user may enable the user interface mode via the touchscreen 106 prior to insertion of the device within the carry case 130. As another alternative, the communication device may first be inserted within the carry case 130, with the user interface mode being automatically enabled upon fingertip access to the access through-holes to automatically activate the touchsceen 106 and then rotation of the guide wheel to control the predetermined function. Removal of the user interface 102 from the portable communication device 104 may automatically put the touchscreen 106 back to its regular touchscreen mode of operation, i.e. the viewing mode.

The user interface 102 may further comprise openings for audio porting such as opening 128 for speaker 118 and a side opening (not shown) for the PTT button 120. Openings for audio porting may not be necessary for devices having porting located outside of the holster/carry case area, such as microphone 116, or for devices having very loud speaker audio.

Also, it should be appreciated that the embodiments described, while particularly advantageous to public safety devices which tend to be half-duplex devices having a PTT, can also be applied to portable communication devices which are non-public safety, full-duplex devices without a PTT. Basically, any portable communication device having a touchscreen providing a variable control function which is difficult to view when the device is worn on the body can take advantage of the tactile, blind operation provided by the user interface of the various embodiments.

Figure 2A:
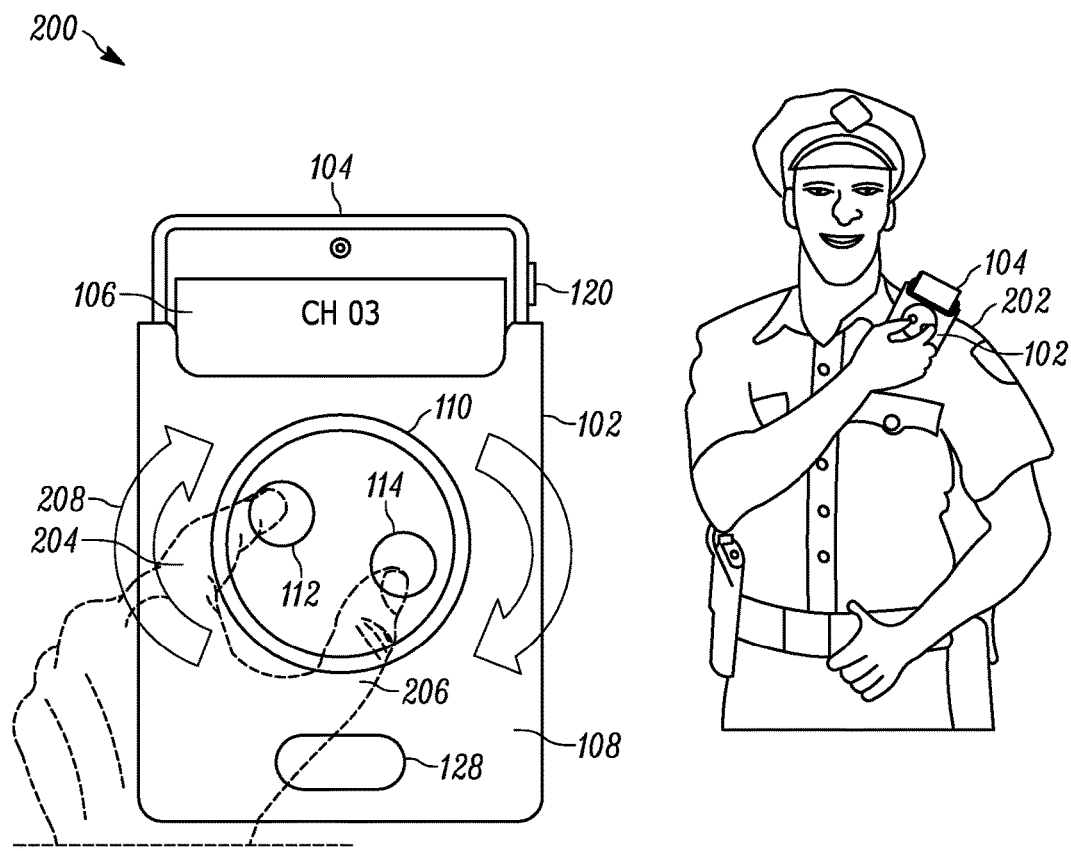
FIG. 2A is the user interface with the portable communication device of FIG. 1 inserted therein and operating in accordance with a user interface embodiment.

FIG. 2A is the user interface 102 and portable communication device 104 of FIG. 1 operating in accordance with a user interface embodiment. As seen in FIG. 2A, portable communication device 104 is being worn at the shoulder of a user 202, such as on an epaulette. When device 104 is worn on the body in this manner, the user 202 has limited to no viewing capability of the touchscreen 106. However, by utilizing the user interface 102, the user is now able to control various functions of the device.

FIG. 2A shows two fingertips 204, 206 of user 202 being inserted into access through-holes 112, 114 which the touchscreen 106 interprets as a selection of a predetermined function, such as channel control 200. Now rotation of the rotatable guide wheel 110, with this predetermined selectable function enabled, allows for the channel to be increased or decreased. For example, clockwise rotation 208 of the guide wheel 110 with dual fingertip insertion 204, 206 increases the channel number selection, and counter clockwise rotation with two fingertip insertion decreases the channel selection.

In accordance with the various embodiments, the dual fingertip insertion into the access through-holes 112, 114 and touching upon the touchscreen 106 are recognized by the controller as enabling the channel control function. The touchscreen 106 with controller operation thereof, measures the difference in change of position from the start of rotation to the end of rotation, for example rotation 208, and therefore the actual location of the start point and end point are not position dependent. In other words, a range of rotation can be used to determine the variation of a selected control function. Thus, the rotatable guide wheel 110 may be inadvertently rotated, for example by being bumped, and still used later with another two fingertip insertion beginning at the different start point brought about by the bumped position, without impacting functionality. The portable communication device measuring the difference (delta) in rotation, or range of rotation, allows the channels to be increased or decreased by rotating the wheel with two fingers while not having to view the touchscreen.

Audible clicks may be added to provide further user feedback to indicate the channel change, if desired.

Hence, the user 202 is able to change channels via the combination of fingertip access through-holes 112, 114 and rotation of the rotatable guide wheel 110.

Figure 2B:
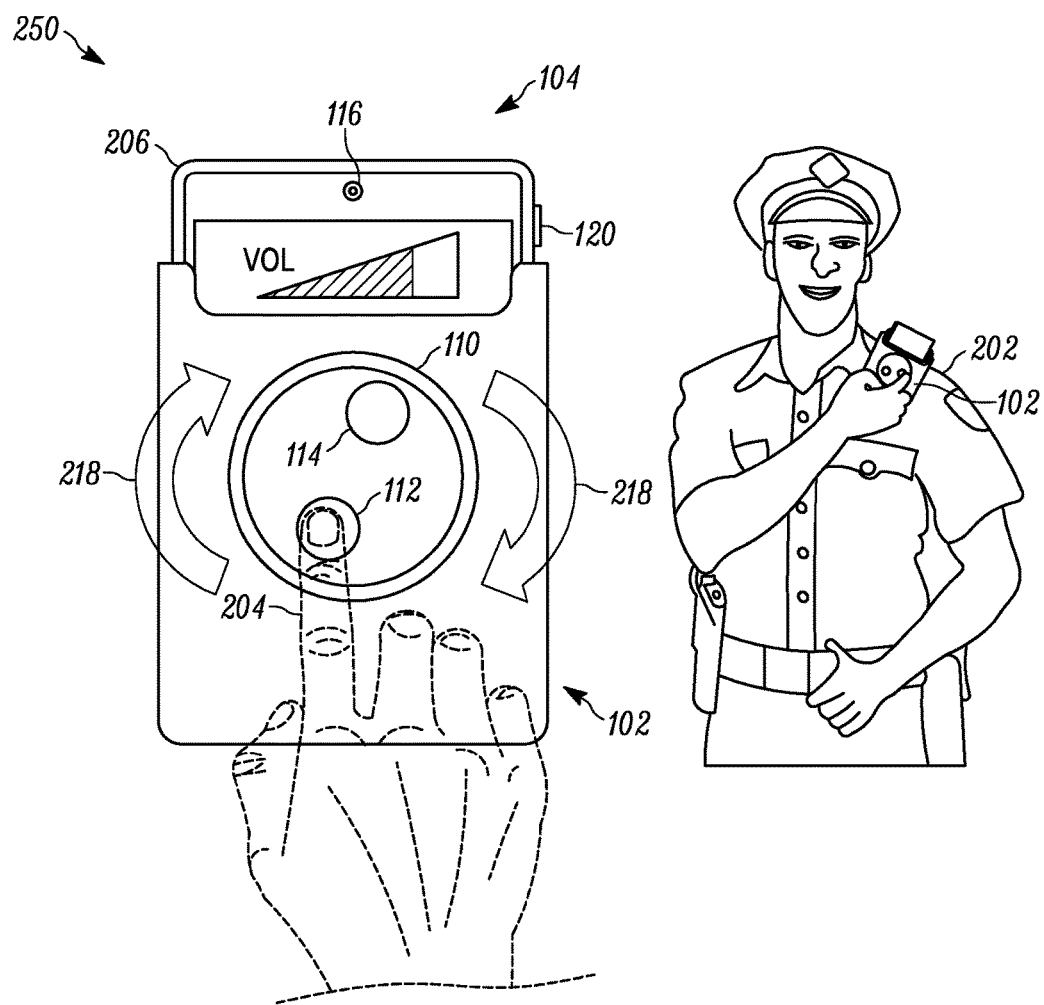
FIG. 2B is the user interface with the portable communication device of FIG. 1 inserted therein and operating in accordance with another user interface embodiment.

FIG. 2B shows the user interface 102 with the portable communication device 104 of FIG. 1 inserted therein and operating in accordance with another user interface embodiment. Here again, device 104 is still being worn at the shoulder of user 202, however portable communication device 104 could be worn at a belt, harness or elsewhere on the body. When device 104 is worn on the body, the user has limited to no viewing capability of the touchscreen. In this case, by utilizing the user interface 102 for the portable communication device 104 in accordance with the embodiments, the user is now able to control another function of the device 104.

FIG. 2B shows a single fingertip 204 of user 202 being inserted into the first access through-hole 112, which the touchscreen 106 via the device's inter controller below interprets as a selection of a predetermined function, such as volume control 250. Now rotation of the guide wheel 110, with this predetermined selectable function enabled, allows for the volume to be controlled. In this case, rotation 218 of guide wheel 110 clockwise with fingertip 204 inserted into access through-hole 112, increases volume and rotation counter clockwise decreases volume. Hence, the user 202 is able to select volume using access through-hole 112, and then adjust volume via rotation of the guide wheel 110 with fingertip inserted into access through-hole 112.

In accordance with the various embodiments, the single fingertip insertion into the access through-hole 112 or 114 touching upon the touchscreen 106 is recognized by the controller as enabling the volume control function. The touchscreen 106 with controller operation thereof, measures the difference in change of position from the start of rotation to the end of rotation, for example rotation 218, and as with the previous channel control, the actual location of the start point and end point is not position dependent. The portable communication device measuring the difference (delta) in rotation, or range of rotation, allows the volume to be increased or decreased by rotating the guide wheel 110 with a single fingertip while not having to view the touchscreen.

Figure 3A:
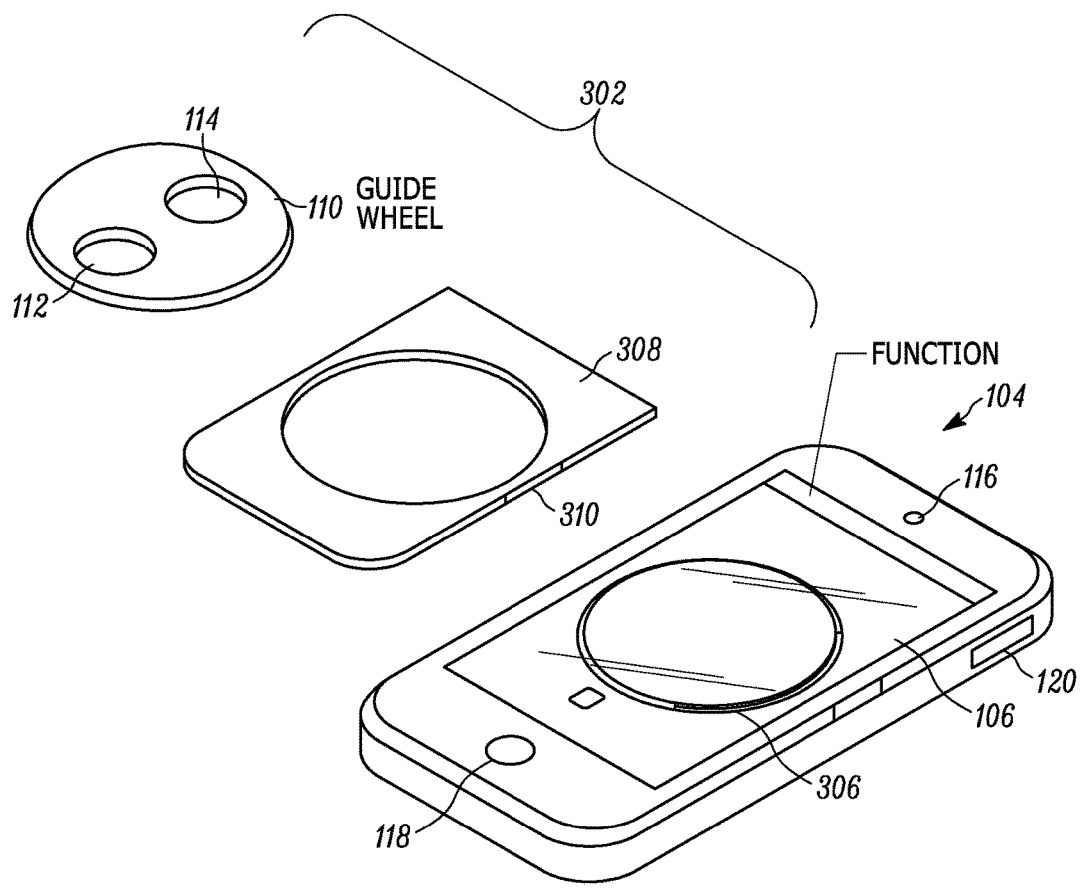
FIG. 3A is an exploded view of another user interface assembly and the portable communication device in accordance with some embodiments.

FIG. 3A is an exploded view of a user interface 302 and portable communication device 104 having touchscreen 106 in accordance with various embodiments. The physical overlay 108 of FIG. 1, which was shown incorporated into a carry case/holster form, is shown here in FIG. 3A as a overlay retainer plate 308. Overlay retainer plate 308 may be formed of a low profile, plastic overlay which incorporates snaps, clips, slide-in or other retaining feature 310, along with the rotatable guide wheel 110, shown here as low profile, rotational wheel having first and second opposing access through-holes 112, 114, which corresponds to the underlying touchscreen 106 of the device. The first and second opposing access through-holes 112, 114 are through through-holes which allow fingertip access to the surface of to the touchscreen 106 below. In FIG. 1, the touchscreen 106 showed the regular touchscreen controls, while FIG. 3A shows an example what the touchscreen 106 may look like when one of the predetermined functions, such as channel control or volume control, has been enabled via user interface 302.

Touchscreen 106 shows a virtual control representation 306, such as a circle, of how the touchscreen 106 operates once a predetermined function has been selected that has an increasing or decreasing control capability associated with it, such as volume control and channel change, that can be increased or decreased via rotatable guide wheel 110. In this case a circular shape is shown, however the touchscreen 106 could also be blank—since it is hidden behind overlay retainer plate 308 and guide wheel 110. While the control representation 306 is not visible to the user, it has been shown here as an example of how the functionality of the touchscreen 106 has been changed by the user interface 102. The touchscreen 106/308 is managed via the radio controller (not shown) of portable communication device 104 which accepts touch input in a manner known in the art.

Figure 3B:
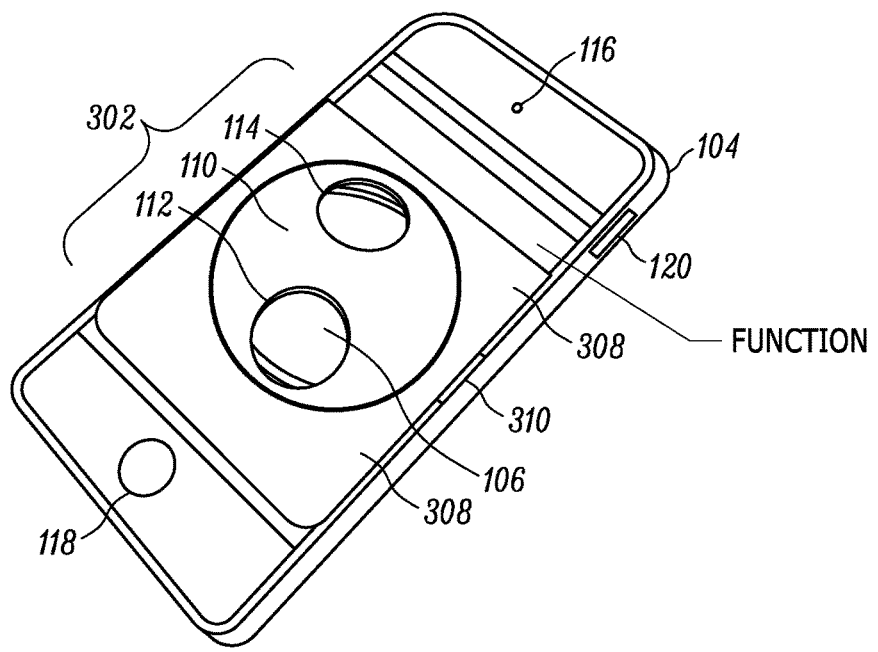
FIG. 3B shows the user interface of FIG. 3A assembled and coupled to the portable communication device in accordance with some embodiments.

FIG. 3B shows the user interface of FIG. 3A assembled and coupled to the portable communication device in accordance with some embodiments. In some embodiments, the coupling of the user interface 302 to the portable communication device 104 may automatically enable a tactile user interface mode recognized by a communication device controller (shown in FIG. 4). Alternatively, a user may manually enter the tactile user interface mode by using normal touchscreen operation (viewing the screen and selecting a function), prior to coupling the overlay retainer plate 308 to the portable communication device.

The rotatable guide wheel 110 provides a rotary device with single and dual fingertip insertion access through-holes for function selection. The guide wheel 110 provides a rotary device that emulates a tactile mechanical knob in that rotation allows the functionality of the selected control to be varied, for example volume up/down and change up and down.

Figure 3C:
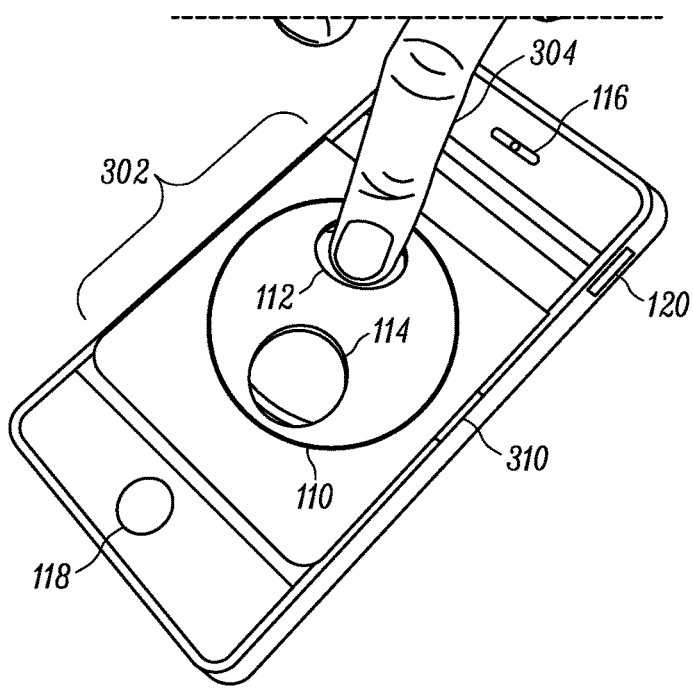
FIG. 3C shows fingertip access of the user interface coupled to the portable communication device in accordance with some embodiments.

In accordance with the various embodiments, the portable communication device 104 is programmed to detect a single fingertip input and dual fingertip inputs to the access through-holes 112, 114 associated with the rotatable guide wheel 110 combined with detection of rotation of the guide wheel 110 to enable and control a portable communication device function. FIG. 3C shows fingertip access of the user interface coupled to the portable communication device in accordance with some embodiments. As previously described, the rotating guide wheel with fingertip inserted therein form a predetermined guide pattern, such as a circle, on the touchscreen and it is the difference in the change of position from the start of rotation to the end of rotation (the delta) that determines the change in volume or channel.

Once the touchscreen 106 has sensed the selected function via the user fingertip at the selected access through-hole 112 or 114, or 112 and 114, the touchscreen converts as shown in FIG. 3A to a virtual control representation 306 of that function. Thus, the combination of continued fingertip press while moving the guide wheel provides the variable control of the selected touchsceen function which thereby controls that function on the portable communication device. The first or second access through-holes, 112 or 114, generate the same predetermined guide pattern in response to a single fingertip input. Thus, each of the first access through hole and the second access through-hole can be said to generate a first predetermined guide pattern on the touchscreen in response to receiving a first fingertip input. A second predetermined guide pattern is generated by fingertip input into both access through-holes 112 and 114.

The user interface 302 allows access to the touchscreen 106 of a portable communication device 104 where the touchscreen may not be readily viewable or accessible. For example, portable communication device 104 may be a public safety radio or accessory worn on the belt, harness or epaulette. The user interface 102, 302 allows a user to access the device via the tactile feedback provided by the rotatable guide wheel 110 having access through-holes 112, 114 without having to remove device and view the screen.

Controlled tactile access to the touchscreen 106 has been provided, for example for volume control via one fingertip access to guide wheel 110, and channel control via two fingertip access to rotatable guide wheel 110. The touchscreen of the various embodiments can be returned to its original, uninterrupted state by simply removing the user interface 102 or 302 returns the touchscreen 106 of the device to it regular operation of user selectable pictures, icons and/or words 122 displayed on the screen for viewing by a user.

Figure 4:
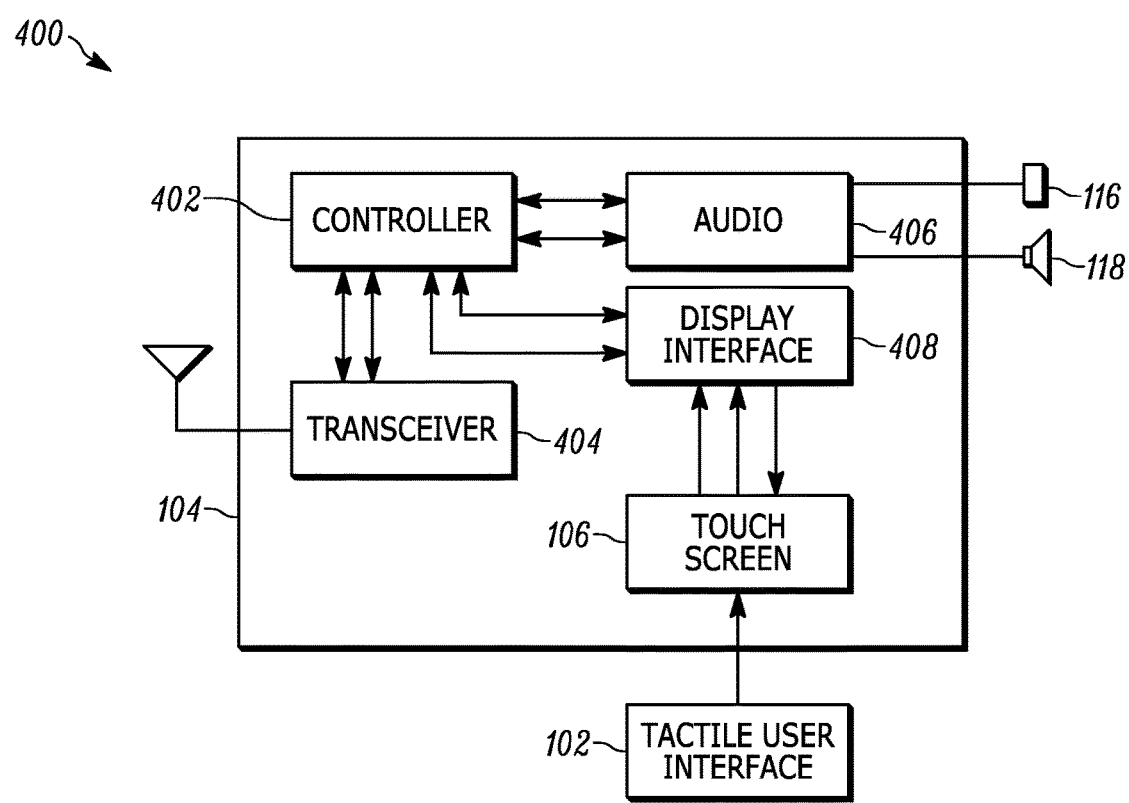
FIG. 4 is a block diagram of the portable communication device having a touchscreen operating in conjunction with user interface in accordance with the various embodiments.

FIG. 4 is a block diagram 400 of the portable communication device 104, described here as a radio, having touchscreen 106 operating in conjunction with user interface 102 in accordance with the various embodiments. Portable communication device 104 comprises a controller 402 operatively coupled to a transceiver 404 for performing transmit and receive, an audio section 406 for handling audio transmissions into microphone 116 and processing of audio signals received at speaker 118. Controller 402 may comprises a microprocessor and signal processing devices for managing the transceiver functions, audio functions, and in accordance with the various embodiments, inputs to touchscreen 106 transferred through display interface 408 to controller 402. The controller 402 provides a method in which the application of the user interface 102 to the radio is detected by the controller 402 so that the tactile selection and control of radio features can begin, without requiring the user to view the screen. For example, a method 500 shown in FIG. 5 is controlled by controller 402.

Figure 5:
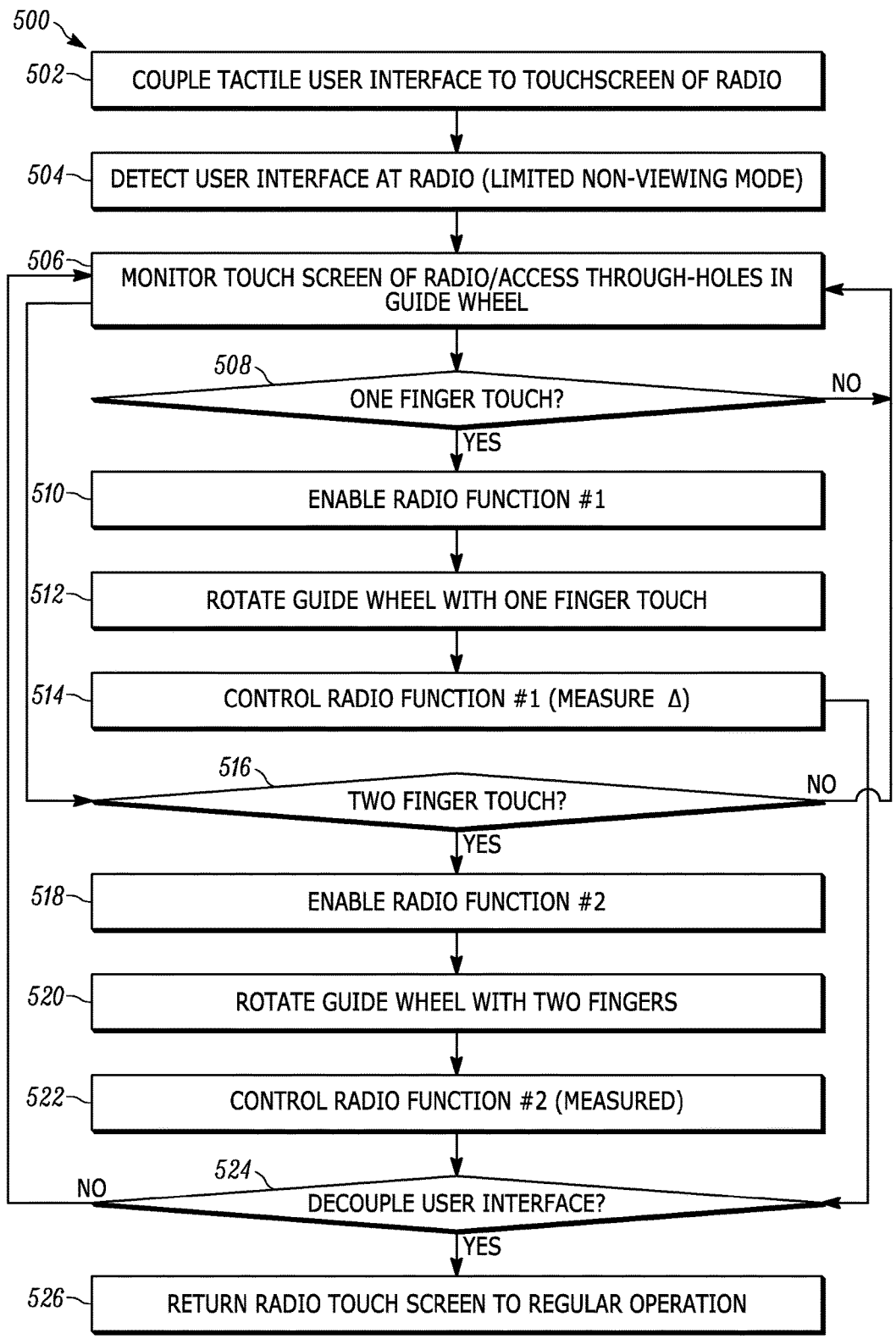
FIG. 5 is a method for controlling a radio having a touchscreen in accordance with the various embodiments.

FIG. 5 is a method 500 for controlling a radio having a touchscreen, such as touchscreen 106 in accordance with the various embodiments. At step 502, the tactile user interface is applied to the portable radio and is detected by the radio's controller at 504. The application of the user interface infers that the radio is being used in an operating mode in which the user has a limited viewing mode, such as wearing the device at the shoulder, harness, or belt.

The touchscreen then monitors for touchscreen access at 506 with one or two fingertip touches. The access through-holes in the rotatable guide wheel beneficially guide the user to intuitively utilize the correct interface for interacting with the touchscreen using one or two fingers. If the radio determines that the user interface was touched with a single finger at 508, then a first radio function is enabled at 510. By rotating the guide wheel with a single finger inserted into the rotatable guide wheel at 512, the first radio function is controlled at 514. The first radio function is controlled by measuring the difference between the beginning and the end of the path, or rotation range, travelled. Thus, taking volume level as an example, a one eighth turn may result in a first volume level increase (or decrease), a half perimeter turn would result in another volume level change, a full perimeter turn would result in a third volume level change, and two full perimeter turns would result in yet another volume level change. Thus, the beginning and end points are not position dependent. The increments can be predetermined based on the size and control range of a particular device. For example the volume level can be spread across one or more complete turns of the rotatable guide wheel.

Returning to 506, if the radio determines that two fingers touched the touchscreen at 516 then a second radio function is enabled at 518. By rotating the rotatable guide wheel with the two fingers inserted at 520, the second enabled function is controlled. The second radio function is also controlled by measuring the difference between the beginning and the end of the path, or rotation range, travelled. Thus, taking channel control as an example, a quarter turn may result in a first channel change, a half perimeter turn would result in another channel change, a full perimeter turn would result in a third channel change, and two full perimeter turns could be another channel change. Again, the beginning and end points are not position dependent. Again, the increments can be predetermined based on the size and control range of a particular device. For example, the channel change can be spread across partial increments of one or more complete turns of the guide wheel.

Upon completion of the radio control function at 514 or 522, the radio monitors for the user interface being decoupled from the radio at 524. As long as the user interface remains coupled at 524, then radio continues to monitor the touchscreen at 506. Otherwise, if the user interface is decoupled from the radio at 524, then the radio returns the touchscreen to a regular mode of operation in which the icons, pictures and/or words 122 are displayed for the user to view and access in a non-limited viewing mode.

The user interface 102, 302 provided by the various embodiments provides tactile feedback without the use of complex switches. The use of fingertip access through-holes 112, 114 within the rotating rotatable guide wheel 110 provides a very intuitive means for a user's fingertip(s) to be guided in an insert rotate manner. The ability of the user to adjust a function of a body worn portable communication device without having to remove the device from the body provides an increased level of user control.

The user interface 102, 302 provided by the various embodiments provides the ability to use tactile differentiation for enable different control functions on a flat touchscreen. Wearable devices can now offer blind operation by offering the user interface that provides the ability to select a control function with one fingertip or two fingertip insertion into through-hole(s) of a rotatable guide wheel, and control of that selected function by simply rotating the through-holes(s).

Accordingly, there has been provided an improved user interface which permits access to a touchscreen of a portable communication device. The ability to access the touchscreen without having to view the touchscreen is highly beneficial, particularly in public safety communication environments where the ability to view a touchscreen can be limited. Public safety communication devices, such as portable radios and/or body worn radio accessories, can benefit greatly from the improved user interface formed in accordance with the various embodiments.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A user interface for a touchscreen, comprising:
    a physical overlay for coupling to the touchscreen; and
    a rotatable guide wheel coupled to the physical overlay, the rotatable guide wheel having fingertip access through-holes formed therein for accessing and providing blind operation of the touchscreen, the touchscreen having controller operation thereof for enabling predetermined functions based on one fingertip insertion and two fingertip insertion into the fingertip access through-holes and for providing variable control of the enabled predetermined functions by measuring a difference in change of position from a start of rotation to an end of rotation of the rotatable guide while without dependence on an actual location of a start point and an end point.

2. The user interface of claim 1, wherein the fingertip access through-holes enable predetermined functions of the touchscreen, and rotation of the rotatable guide wheel controls variability of the predetermined functions of the touchscreen.

3. The user interface of claim 2, wherein a range in rotation of the rotatable guide wheel controls the variability for each predetermined function.

4. The user interface of claim 1, wherein the physical overlay is attachable to and removable from the touchscreen.

5. The user interface of claim 1, wherein the physical overlay with rotatable guide wheel is formed as part of a holster or carry case.

6. The user interface of claim 1, wherein the rotatable guide wheel comprises:
    a first fingertip access through-hole;
    a second fingertip access through-hole; and
    wherein a first predetermined touchscreen control function is enabled in response to a single fingertip being input into either of the first or second fingertip access through-holes;
    a second predetermined touchscreen control function is enabled in response to dual fingertips being input into both the first and second fingertip access through-holes; and
    the first predetermined touchscreen control function is controlled by a range of rotation of the rotatable guide wheel with single fingertip insertion; and
    the second predetermined touchscreen control function is controlled by a range of rotation of the rotatable guide wheel with dual fingertip insertion.

7. A portable communication device, comprising:
    a touchscreen; and
    a physical overlay having a rotatable guide wheel with a plurality of access through-holes overlaying the touchscreen, the plurality of access through-holes providing a user interface for accessing and providing blind operation of the touchscreen and controlling variable control functions for the portable communication device,
    wherein the variable control functions are enabled based in response to one and two fingertip insertion into the plurality of access through-holes and controlled based on a difference in change of position from a start of rotation to an end of rotation without dependence on an actual location of a start point and an end point.

8. The portable communication device of claim 7, wherein the variable control function comprises volume control and channel control.

9. The portable communication device of claim 7, wherein the plurality of access through-holes comprises two access through-holes, and the variable control function is determined by insertion of one or two fingers into the two access through-holes and rotation of the rotatable guide wheel.

10. The portable communication device of claim 7, wherein the physical overlay is attachable to and removable from the touchscreen.

11. The portable communication device of claim 7, wherein the physical overlay is embodied in a holster or carry case.

12. The portable communication device of claim 7, wherein the portable communication device comprises a public safety radio or public safety accessory.

13. The portable communication device of claim 7, wherein the portable communication device comprises a wearable, portable communication device, the touchscreen not being viewable by a user when the portable communication device is body worn.

14. A communication system, comprising:
   a portable communication device having a touchscreen; and
   a user interface removably coupled to the touchscreen, the user interface comprising:
   a physical overlay having a rotatable guide wheel, the rotatable guide wheel providing a combination of fingertip access through-holes to the touchscreen and rotational movement of the rotatable guide wheel, the combination providing blind operation control of predetermined variable control functions to the portable communication device, wherein the predetermined variable control functions are enabled based in response to one and two fingertip insertion into the fingertip access through-holes and controlled based on a difference in change of position from a start of rotation to an end of rotation without dependence on an actual location of a start point and an end point.

15. The communication system of claim 14, wherein the portable communication device is a body wearable device.

16. The communication system of claim 14, wherein the physical overlay is incorporated into one of: a carry case, a holster, a harness, a removable/attachable plate.

17. The communication system of claim 14, wherein the predetermined variable control functions of the portable communication device comprise:
   volume control and channel control.

18. The communication system of claim 14, wherein the touchscreen of the portable communication device returns operation to a regular viewing touchscreen mode of operation upon removal of the user interface from the touchscreen.

19. A method of controlling a portable radio having a touchscreen, comprising:
   enabling a limited viewing user interface mode for the portable radio having the touchscreen;
   detecting a single finger input to the touchscreen input to the touchscreen of the portable radio;
   enabling a first predetermined variable control function of the portable radio in response to the detected single finger input to the touchscreen;
   rotating the single finger input associated with the enabled predetermined variable control function utilizing a first user interface guide pattern; and
   controlling the first predetermined variable control function of the portable radio based on a range of rotation of the first user interface guide pattern, without dependence on an actual location of a start point and an end point; and
   detecting a dual finger input to the touchscreen of the portable radio;
   enabling a second predetermined variable control function of the portable radio in response to the detected dual finger input to the touchscreen;
   rotating the dual finger input associated with the enabled second predetermined variable control function utilizing a second user interface guide pattern; and
   controlling the second predetermined variable control function of the portable radio based on a range of rotation of the second user interface guide pattern, without dependence on an actual location of a start point and an end point.

20. The method of claim 19, further comprising:
   returning to a regular viewing and touchscreen mode upon removal of a physical user interface from the touchscreen.

* * * * *